United States Patent [19]

Frank

[11] 3,922,421
[45] Nov. 25, 1975

[54] BLENDS OF ACID-CONTAINING COPOLYMERS AND COPOLYMERS OF ACRYLONITRILE AND A CONJUGATED DIOLEFIN

[75] Inventor: Harold G. Frank, Bay City, Tex.

[73] Assignee: The Dow Chemical Company, Midland, Mich.

[22] Filed: Jan. 29, 1973

[21] Appl. No.: 327,395

[52] U.S. Cl. ............... 428/214; 428/215; 428/337; 428/339; 428/344; 428/355; 428/461; 260/889; 260/876 R
[51] Int. Cl.$^2$ ................ B32B 7/02; B32B 15/08; B32B 27/32; B32B 15/20
[58] Field of Search ...... 161/165, 217; 117/132 CB, 117/161 UN; 260/889, 32.4, 82.3

[56] References Cited
UNITED STATES PATENTS

| | | | |
|---|---|---|---|
| 3,044,977 | 7/1962 | Coe | 161/217 |
| 3,108,709 | 10/1963 | Bosmajian | 117/132 CB |
| 3,384,612 | 5/1968 | Brandt et al. | 260/889 |
| 3,421,766 | 1/1969 | Chmiel et al. | 260/889 |
| 3,454,676 | 7/1969 | Busse | 260/889 |
| 3,520,861 | 7/1970 | Thomson et al. | 156/326 |
| 3,595,826 | 7/1971 | Conard | 260/82.3 |
| 3,642,954 | 2/1972 | Turner | 260/889 |
| 3,644,244 | 2/1972 | Fryd et al. | 117/132 CB |

Primary Examiner—George F. Lesmes
Assistant Examiner—William R. Dixon, Jr.
Attorney, Agent, or Firm—Arthur J. Young; Ralph M. Mellom

[57] ABSTRACT

Compositions having improved adhesive characteristics comprise an intimate mixture of a copolymer of ethylene and an $\alpha,\beta$-ethylenically unsaturated carboxylic acid such as acrylic acid and a copolymer of acrylonitrile and a conjugated diolefin such as 1,3-butadiene. Laminates of the adhesive composition and aluminum exhibit higher bond strengths than the bond strengths of the adhesive composition to other metals. The adhesive compositions have widespread utility and are particularly suitable as bonding agents in the wire and cable field.

4 Claims, No Drawings

BLENDS OF ACID-CONTAINING COPOLYMERS AND COPOLYMERS OF ACRYLONITRILE AND A CONJUGATED DIOLEFIN

This invention relates to polymer blends of carboxylic acid-containing copolymers and copolymers of acrylonitrile. In one aspect, this invention relates to intimate mixtures of copolymers having improved adhesive characteristics. In another aspect, this invention relates to laminates of an aluminum layer and a layer of a tightly adhering polymer material.

It is well-known in the art that carboxylic acidcontaining polymers such as copolymers of ethylene and acrylic acid possess good adhesiveness to other materials including many plastics, metals, cellulose products, and the like. U.S. Pat. No. 3,520,861 is illustrative of this general class of adhesive copolymers. While these copolymers represent a substantial contribution to the art of adhesive polymers, efforts continue to discover more and better adhesive polymer systems.

According to this invention, it has been discovered that the adhesive characteristics of a carboxylic acid-containing copolymer are improved by the addition of a copolymer of acrylonitrile and a conjugated diolefin. The copolymer of acrylonitrile and conjugated diolefin is of relatively low molecular weight and is in a liquid state when added to the carboxylic acid-containing copolymer. Thus, the compositions of the invention comprise an intimate mixture or blend of a copolymer of ethylene and an $\alpha,\beta$-ethylenically unsaturated carboxylic acid and a relatively low molecular weight copolymer of acrylonitrile and a conjugated diolefin which in its uncured state is in the form of a liquid at normal room temperature. This invention also includes laminates comprising a layer of aluminum and a layer of the adhesive composition in the form of the intimate mixture or blend as described above.

Accordingly, it is an object of this invention to provide a composition having improved adhesive characteristics.

Another object of this invention is to improve the adhesive properties of carboxylic acid-containing copolymers.

A further object of this invention is to provide an improved laminate of aluminum and a layer of an adhesive polymer composition.

Yet another object of this invention is to provide an improved cable shielding tape having an improved adhesive polymer coating.

These and other objects of the invention will become apparent to one skilled in the art after studying the following detailed description and the appended claims.

The acid-containing copolymer in the adhesive composition of the invention comprises a copolymer of ethylene and an $\alpha,\beta$-ethylenically unsaturated carboxylic acid having between three and eight carbon atoms per molecule. The acid-containing copolymers can be of the random variety or the graft variety. These copolymers can be obtained commercially or they can be prepared by a variety of suitable techniques well-known in the polymerization art. While the invention is not to be limited by any particular technique for preparing the copolymers, suitable methods for preparing the graft copolymers are described in U.S. Pat. Nos. 3,177,269 and 3,270,090, the disclosures of which are specifically incorporated herein by reference. An exemplary technique for preparing the random copolymers involves subjecting a mixture of ethylene and a suitable acid monomer to a high pressure such as between about 500 and about 1,000 atmospheres and to an elevated temperature such as between about 100° and about 400°C. in the presence of a free radical initiator such as ditertiary butylperoxide or $\alpha,\alpha$-azobisdiisobutyronitrile. Polymerization conditions can be varied to produce random copolymers having the desired molecular weight. The acid-containing copolymers which can be employed in preparing the composition of the invention generally have a melt index as determined by ASTM Test Procedure 1238 (Condition E) of between about 0.5 and about 100 and preferably between about 1 and about 40. The molecular weight of the acid-containing copolymers as determined by standard gel permeation is generally between about 20,000 and about 150,000 and preferably between about 35,000 and about 90,000.

Any $\alpha,\beta$-ethylenically unsaturated carboxylic acid which is copolymerizable with ethylene or which is suitable for grafting onto a homopolymer of ethylene can be used to prepare the acid-containing copolymer. Exemplary carboxylic acids, including mono- and polybasic acids, acid anhydrides and partial esters of polybasic acids, include acrylic acid, methacrylic acid, crotonic acid, fumaric acid, maleic acid, itaconic acid, maleic anhydride, monomethyl maleate, monoethyl maleate, monomethyl fumarate, monoethyl fumarate, tripropylene glycol monomethyl ether acid maleate, ethylene glycol monophenyl ether acid maleate, and the like. In general, the acid-containing copolymer contains between about 1 and about 20 weight percent and preferably between about 3 and about 15 weight percent of the ethylenically unsaturated carboxylic acid.

The copolymer of acrylonitrile and conjugated diolefin in the adhesive composition of the invention is a relatively low molecular weight nitrile rubber polymer which in its uncured state and in the absence of solvents is in a liquid state having a sufficiently low viscosity to permit flow at ordinary room temperature. These copolymers can be obtained commercially or they can be prepared by copolymerizing acrylonitrile and the conjugated diolefin having between 4 and 8 carbon atoms per molecule by processes well-known in the polymerization art. The "Encyclopedia of Chemical Technology," Second Edition, Kirk-Othmer (1965), pp. 682 and 683, describes these types of copolymers and the techniques by which they can be prepared. Exemplary conjugated diolefins which can be used to prepare the copolymer include 1,3-butadiene, isoprene, piperylene, methylpentadiene, 3,4-dimethyl-1,3-hexadiene, and the like. As a general proposition, the copolymers of acrylonitrile and conjugated diolefins contain between about 15 and about 60 weight percent acrylonitrile and between about 40 and about 85 weight percent conjugated diolefin.

The composition of the invention in the form of an intimate mixture or blend can be prepared by blending or mixing the acid-containing copolymer and the copolymer of acrylonitrile and conjugated diolefin by any suitable technique. For example, the intimate mixture can be prepared by blending on a heated mill roll, a Banbury mixer, a mixing extruder, or the like. In general, the intimate mixture or blend contains between about 50 and about 98 and preferably between about 80 and about 98 weight percent acid-containing copolymer and between about 2 and about 50 and preferably between about 2 and about 20 weight percent copolymer of acrylonitrile and conjugated diolefin. When a laminate of aluminum and the composition is prepared, as will be more fully hereinafter described, it is generally preferred that the intimate mixture contain between about 80 and about 98 weight percent acid-containing polymer and between about 2 and about 20 weight percent copolymer of acrylonitrile and conjugated diolefin.

The laminates of the invention have utility in a wide variety of fields such as, for example, coating resins in the packaging industry, adhesives in the wire and cable industry, and the like. The compositions of the invention are particularly suitable for preparing cable shielding tape in the form of a laminate of aluminum having one or both sides coated with or bonded to a layer of the composition. The laminate can be prepared by extrusion coating, film lamination, or the like.

The following example, which is presented for the purpose of illustration only, describes one technique for preparing a composition of the invention and a laminate which includes the composition.

EXAMPLE

Several intimate mixtures of a copolymer of ethylene and acrylic acid and a copolymer of acrylonitrile and 1,3-butadiene were prepared by blending on a heated mill roll to provide mixtures having different amounts of each component. The copolymer of ethylene and acrylic acid had a melt index of about 5 and contained about 8 percent by weight acrylic acid. The acrylonitrile/1,3-butadiene copolymer was a low molecular weight liquid of medium high acrylonitrile content (about 30 wt. percent) produced by the B. F. Goodrich Chemical Co. under the designation Hycar 1,312. The resulting blends were then compression molded into films about 30 mils thick. Portions of each of the films were then laminated to various metals in the form of tapes about 36 mils thick by means of a heated platen press. The adhesiveness of the several blends to the various metals was then determined by measuring the 90° peel strength of the films to the metal tapes by the technique described in ASTM Test Procedure D 903 except a cross-head separation rate of 2 inches per minute was used. The results obtained are reported in the Table I below. Also reported in the Table I are the peel strengths measured by the same technique in several control runs wherein other metals were used.

TABLE I

| Run No. | Metal Layer | Polymer Blend E/AA[a] (weight percent) | VCN/BD[b] (weight percent) | Peel Strength (lbs./in. of width) |
|---|---|---|---|---|
| C1 | Aluminum | 100 | 0 | 5.1 |
| 1 | " | 98 | 2 | 5.4 |
| 2 | " | 95 | 5 | 6.4 |
| 3 | " | 90 | 10 | 11.9 |
| 4 | " | 80 | 20 | 9.0 |
| C2 | Copper | 100 | 0 | 19.6[c] |
| C3 | " | 98 | 2 | 21.0[c] |
| C4 | " | 95 | 5 | 12.5 |
| C5 | " | 90 | 10 | 13.9 |
| C6 | " | 80 | 20 | 6.2 |
| C7 | Steel | 100 | 0 | 21.2[c] |

TABLE I-continued

| Run No. | Metal Layer | Polymer Blend E/AA[a] (weight percent) | VCN/BD[b] (weight percent) | Peel Strength (lbs./in. of width) |
|---|---|---|---|---|
| C8 | " | 98 | 2 | 18.9 |
| C9 | " | 95 | 5 | 20.6[c] |
| C10 | " | 90 | 10 | 18.9 |
| C11 | " | 80 | 20 | 13.4 | a - E/AA means copolymer of ethylene and acrylic acid.
b - VCN/BD means copolymer of acrylonitrile and 1,3-butadiene.
c - Polymer film ruptured during peel test (maximum value recorded).

As indicated by the data in Table I, the adhesiveness of the ethylene/acrylic acid copolymer to aluminum is improved with the addition of the acrylonitrile/butadiene copolymer. In contradistinction to that surprising result, the adhesiveness of the ethylene/acrylic acid copolymer to copper and steel decreases with the addition of acrylonitrile/butadiene copolymer.

The laminates of the invention can have one or both surfaces of the aluminum substrate or layer coated with a layer of the adhesive composition. While the thicknesses of the individual layers in the laminate will depend largely upon the particular utility intended and are therefore a matter of personal choice, as a general proposition the aluminum layer is of a thickness between about 0.5 and about 50 mils and the adhesive composition layer is of a thickness between about 0.2 and about 40 mils. It is evident that thicknesses outside of these ranges can be employed if desired.

Although the invention has been described in considerable detail, such description is for the purpose of illustration only and many modifications and variations can be made by one skilled in the art without departing from the spirit and scope thereof.

What is claimed is:

1. A laminate comprising a layer of aluminum and a layer of an adhesive composition comprising an intimate mixture of between about 80 and about 98 weight percent acid-containing copolymer of ethylene and an $\alpha,\beta$-ethylenically unsaturated carboxylic acid having between 3 and 8 carbon atoms per molecule, said acid-containing copolymer having a melt index between about 0.5 and about 100 and containing between about 1 and about 20 weight percent of said $\alpha,\beta$-ethylenically unsaturated carboxylic acid, and between about 2 and about 20 weight percent copolymer of acrylonitrile and a conjugated diolefin having between 4 and 8 carbon atoms per molecule, said copolymer of acrylonitrile and conjugated diolefin having a relatively low molecular weight characterized in that said copolymer will flow at ordinary room temperature and containing between about 15 and about 60 weight percent acrylonitrile and between about 40 and about 85 weight percent conjugated diolefin.

2. A laminate according to claim 1 wherein said $\alpha,\beta$-ethylenically unsaturated carboxylic acid is acrylic acid.

3. A laminate according to claim 1 wherein said aluminum layer is of a thickness between about 0.5 and about 50 mils and said adhesive composition layer is of a thickness between about 0.2 and about 40 mils.

4. A laminate according to claim 1 wherein said layer of aluminum has a layer of said adhesive composition on both surfaces thereof.

* * * * *